Nov. 25, 1969 L. MASLOW 3,479,681
CASTER ASSEMBLY

Filed Jan. 25, 1967 3 Sheets-Sheet 1

INVENTOR.
LOUIS MASLOW
BY Friedman & Goodman
ATTORNEYS

Nov. 25, 1969 — L. MASLOW — 3,479,681
CASTER ASSEMBLY
Filed Jan. 25, 1967 — 3 Sheets-Sheet 2

INVENTOR.
LOUIS MASLOW
BY Friedman & Goodman
ATTORNEYS

Nov. 25, 1969
L. MASLOW
3,479,681
CASTER ASSEMBLY
Filed Jan. 25, 1967
3 Sheets-Sheet 3
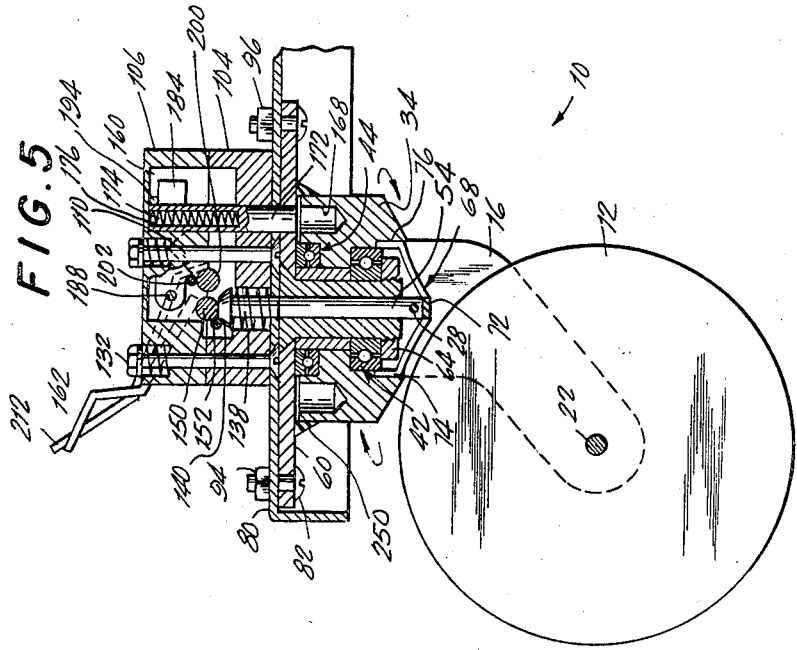
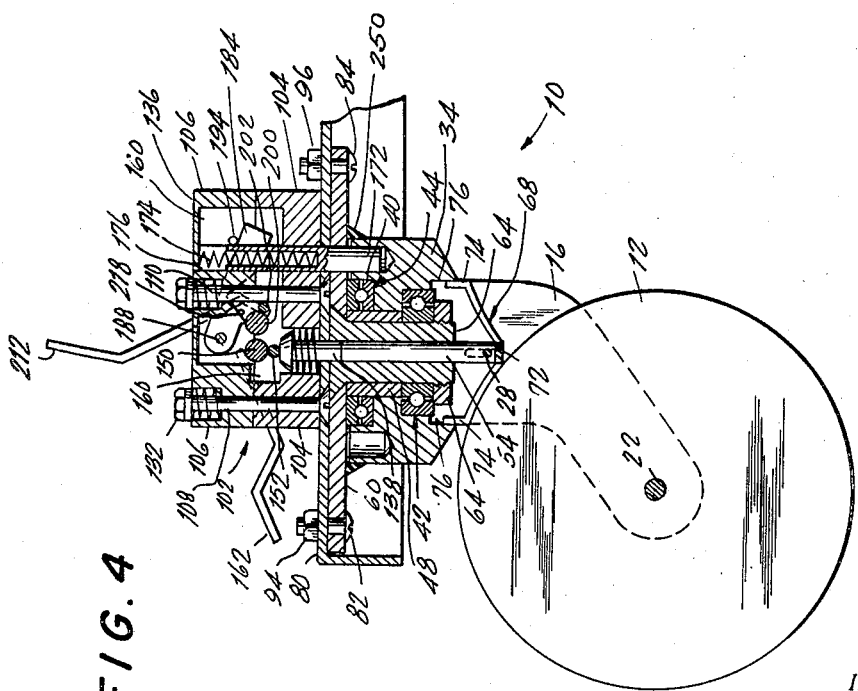
INVENTOR.
LOUIS MASLOW
BY
Friedman + Goodman
ATTORNEYS

United States Patent Office 3,479,681
Patented Nov. 25, 1969

3,479,681
CASTER ASSEMBLY
Louis Maslow, Huntsville Road, Dallas, Pa. 18612
Filed Jan. 25, 1967, Ser. No. 611,650
Int. Cl. B60b 33/00; F16d 63/00
U.S. Cl. 16—35                    10 Claims

ABSTRACT OF THE DISCLOSURE

This invention and this disclosure are directed to a new and unique caster assembly. More particularly and specifically, this invention and its disclosure are directed to a caster assembly provided with a brake mechanism which is so located with respect to the balance of the caster assembly such that the caster wheel itself can be removed without removing the entire brake mechanism. More specifically with respect to the brake mechanism, the invention provides a caster assembly brake mechanism which is operable by controls remote from the caster wheel itself. Furthermore, the brake mechanism does not entail the protrusion or projection of parts radially outward from the caster wheel which represent a hazard in schools, hospitals and other institutions where casters are often employed as a means for facilitating the movement of carts, furniture and the like. Furthermore, the caster assembly of the invention is characterized by permitting removal of the caster wheel without dislodging or removing the caster brake mechanism and other mechanisms in their entirety. Another feature of the invention and this disclosure thereof resides in a brake means for the caster assembly which does not depend upon a specific wheel alignment or position for its operation. Another feature is a swivel brake.

FIELD OF THE INVENTION

This invention resides in the caster assembly field and, more particularly, the caster assembly field characterized by a brake mechanism and a lateral revolution brake mechanism, i.e., a means which prohibits, when in operation, lateral revolution or swivel of the caster about its pivot. Such a mechanism is operable in the case of the instant invention independently of the brake mechanism restraining revolution of the caster wheel about the caster wheel axis.

DISCUSSION OF THE PRIOR ART

Caster assemblies are generally and broadly well known. Those caster assemblies provided with brakes and other movement restraining means have generally necessitated the employment of devices which are operated and located adjacent the caster wheel itself. These devices generally have entailed the employment of some acting lever or the like near the caster wheel protruding in a radial direction outward. The employment of such a device located near the floor has always been considered a dangerous hazard because of the tendency of the user or others to catch his foot or garment on the protruding lever with resultant damage to person or property. Generally, the prior art devices embodying a brake means have not permitted ready removal of the caster wheel without removing substantially the entire caster assembly.

OBJECTS OF THE INVENTION

Because of the foregoing deficiencies of the prior art caster assemblies, it is an object of this invention to provide a caster assembly fitted with a brake means which does not entail the employment of a radially protruding element outward from the caster wheel itself.

It is another object of this invention, therefore, to provide such a caster assembly which permits removal of the caster wheel without necessitating removal of substantially the entire caster assembly.

It is another object of this invention, therefore, to provide such a caster assembly wherein the brake means is operable irrespective of the position of the caster wheel.

It is still another object of this invention, therefore, to provide such a caster assembly which is provided with a brake means operable from a convenient position remote from the caster wheel itself.

It is still another object of the invention, therefore, to provide a caster assembly provided with a brake assembly and a means for limiting or restraining lateral revolution of the caster wheel, especially when the caster wheel brake is in braking position.

These and other objects of my invention will become apparent from the following more complete description of my invention, accompanying drawings, and appended claims.

SUMMARY OF THE INVENTION

Broadly, this invention contemplates a caster assembly comprising a laterally rotatable means provided with a caster wheel rotatable therewith, said caster wheel rotatable vertically with respect to said laterally rotatable means, a caster wheel brake means operable by a caster wheel brake actuating means located remote from said caster wheel, said laterally rotatable means partially housing said brake means and being rotatable with respect thereto, said brake means being operable regardless of the lateral position of said laterally rotatable means.

In another phase of my invention, I contemplate a caster assembly comprising a laterally rotatable means provided with a caster wheel rotatable therewith, said caster wheel rotatable vertically with respect to said laterally rotatable means, said laterally rotatable means provided with a plurality of vertical holes about its periphery adaptable to receive a lateral rotation braking pin, a horizontal stationary plate provided with a downwardly extending column about which said laterally rotatable means is rotatable, said horizontal stationary plate provided with at least one hole which when in registry with one of said vertical holes permits passage of said braking pin therethrough and into said vertical hole, thereby locking said laterally rotatable means to said horizontal stationary plate. This invention contemplates this apparatus in a unitary combined caster assembly.

BRIEF DESCRIPTION OF THE DRAWINGS

The invention can be more readily understood and appreciated by reference to the accompanying drawings in which:

FIGURE 4 is a sectional elevation partially broken away and taken generally along the line 4—4 of FIGURE 2. It shows the caster brake in braking position against the caster wheel and the swivel brake in braking position.

FIGURE 5 is a sectional elevation similar to that of FIGURE 4 with the brake in non-braking position and with the lateral revolution or swivel brake in non-braking position.

DESCRIPTION OF PREFERRED EMBODIMENT

Figure 1:
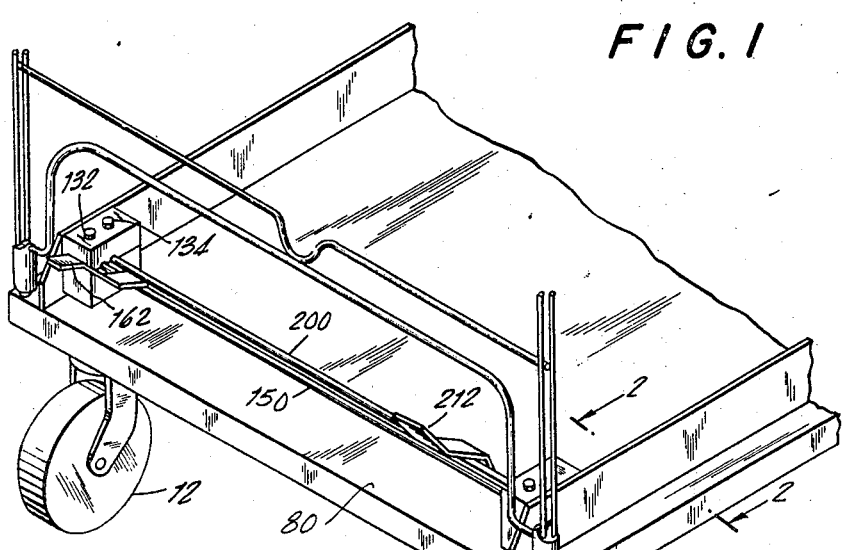
FIGURE 1 is a perspective view of a cart with the caster assembly of my invention in place. This drawing shows the levers which operate the mechanisms, which levers are in a position remote from the caster wheel itself.
Figure 2:
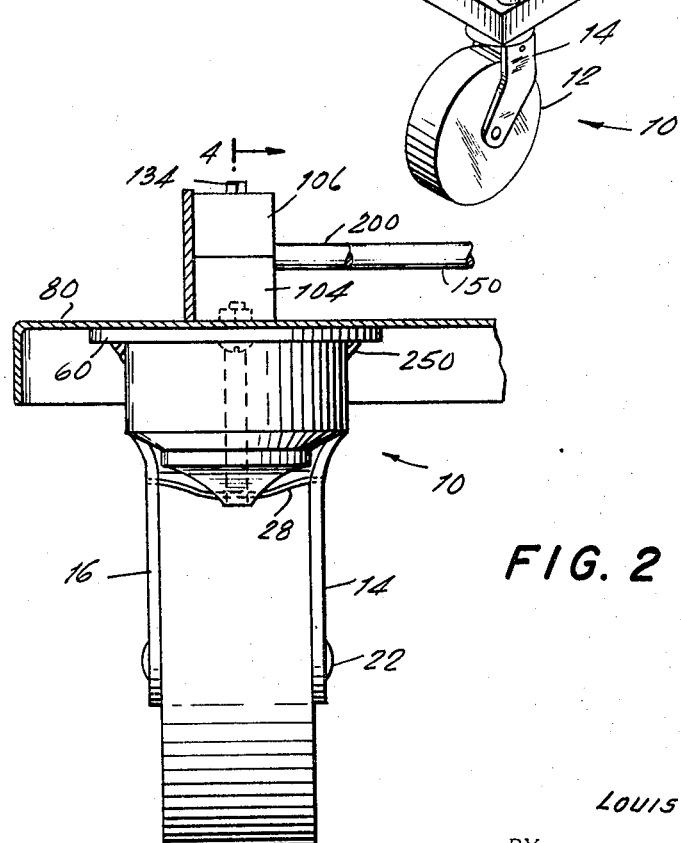
FIGURE 2 is a sectional elevation of the caster assembly provided with the brake mechanism of my invention, which section is taken along lines 2—2 of FIGURE 1.
Figure 3:
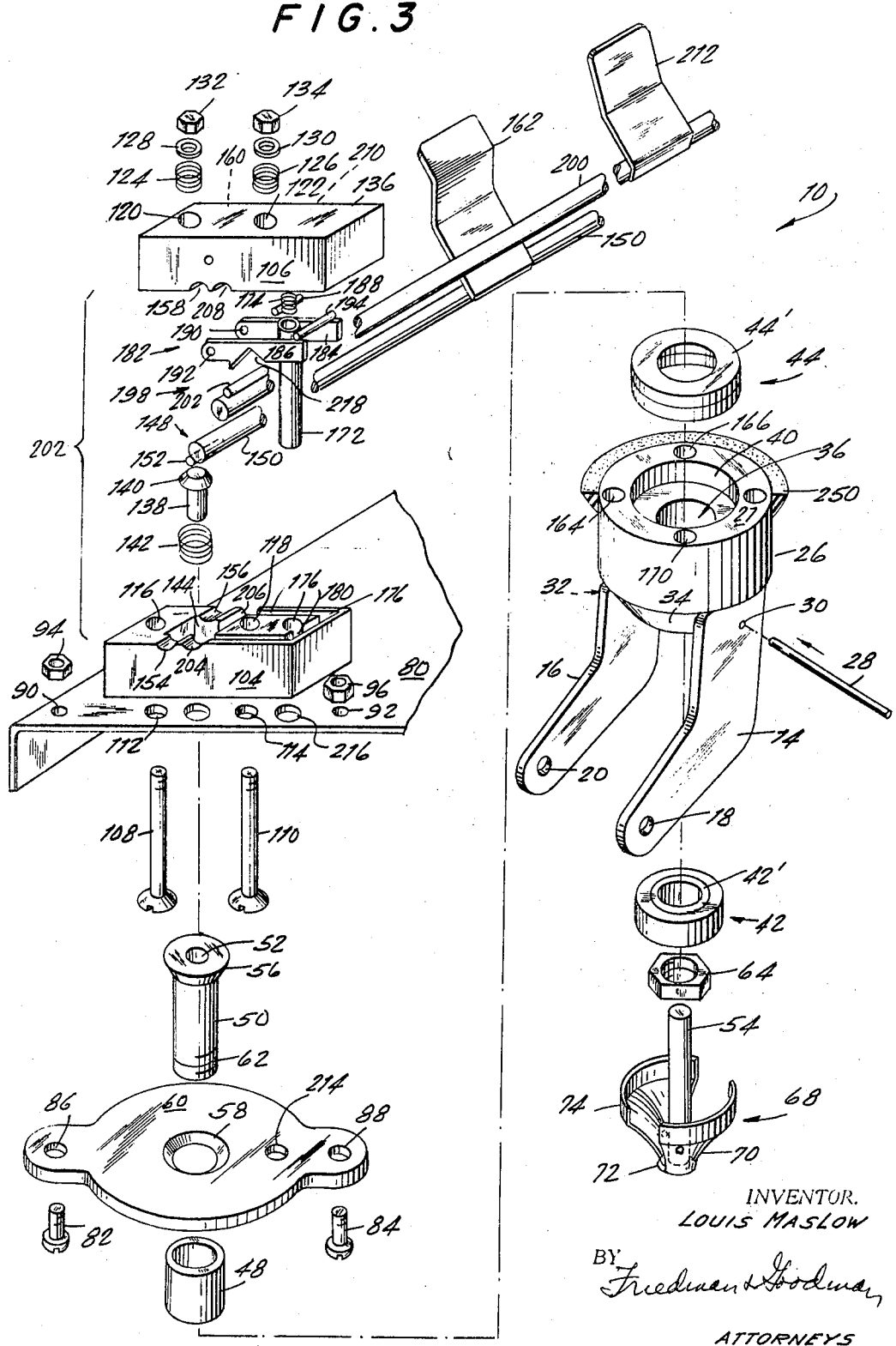
FIGURE 3 is an exploded view of the caster brake assembly and the assembly limiting or restraining lateral revolution of the caster wheel. The caster wheel is not shown in this figure.

A preferred embodiment of my caster assembly is illustrated in the drawings. My invention is directed to a caster assembly 10 comprising a caster wheel 12 provided with caster wheel arms 14 and 16 in the form of a dog-leg and provided at the end thereof with pin holes 18 and 20, as seen in FIGURE 3, through which passes a headed pin 22 when the hole in caster wheel 12 (not shown) is in registry with pin holes 18 and 20. Pin 22 is received by a female pin 24 provided with a head so as to fix wheel 12 in position for rotation, as seen in FIGURE 2. The wheel arms 14 and 16 are secured by a pin 28 or the like onto rotatable mount 26 as seen in FIGURE 3. Pin 28 passes through arms 14 and 16 when holes 30 and 32 are in registry with a hole in rotatable mount 26. The hole is provided in the downwardly and inwardly sloping bottom portion 34 of rotatable mount 26. Rotatable mount 26 is provided with a vertical hole 36 therethrough. Adjacent the hole 36 and abutting it are indented spaces 38 and 40 which are so sized as to receive bearing members 42 and 44. Each bearing member 42 and 44 is in two parts, one of which is in the rotatable mount 26 and the other of which is a bearing part of the member passing through rotatable mount 26. The portion of the bearings which are rotatable are designated by reference numerals 42' and 44', as seen in FIGURES 3, 4 and 5.

Passing through vertical hole 36 and in abutting relationship with bearings 42 and 44 is ring 48. Ring 48 rests on bearing half 42'. Through ring 48 passes circular pin 50 provided with a vertical hole 52 therethrough adapable to receive upwardly extending vertical brake support 54 in rotatable relationship therewith. Circular pin 50 is provided with an outwardly sloping flange 56 which is of such proportions that it fits into a reciprocally beveled hole 58 in plate 60. Pin 50 has a lower disengageable portion 62 which is secured in threaded nut 64 also in abutting relationship with bearing half 42'. Plate 60 is secured to stationary support 80 by virtue of screws 82 and 84 passing through holes 86 and 88 of plate 60, and holes 90 and 92 of stationary support 80 when the latter are in registry with holes 86 and 88, said screws being held firmly in place using nuts 94 and 96 respectively engaging the screws and overlying stationary support 80.

Thus, rotatable mount 26 is rotatable with respect to pin 50, ring 48, nut 64, bearing halves 42' and 44', enabling lateral revolution of caster wheels 12, facilitating turning and the like.

Passing through vertical hole 52 of pin 50 is the vertical brake support in rotatable relationship with said pin. The brake support has affixed thereto at its lower extremity braking element 68 comprising an inwardly curved edge 70, the arc of which is the same as the arc of the caster wheel 12; and thus when the two are in frictional engagement, braking action results. A slightly outwardly extending horizontal bottom 72 is provided to insure braking action when the brake is in operation. Braking element 68 is provided with vertically upwardly extending lip 74 slidable against wall 76 of rotatable mount 26, so that a large proportion of the braking element 68 can be housed within rotatable mount 26. Hence, the braking element itself does not embody any protruding elements or devices adjacent the caster wheel 12 itself, but instead is largely housed in a mount in which also is housed means about which the caster wheel 12 with its arms 14 and 16 are rotatable.

Permanent affixed to stationary support 80 is braking element control housing 102 comprising lower half 104 and upper half 106. Housing 102 is permanently affixed by virtue of upwardly extending end threaded pins 108 and 110 which respectively pass through holes 112 and 114 in stationary support 80, through lower housing half-holes 116 and 118, through upper housing half-holes 120 and 122. The upper extremity of upper housing half-holes 120 and 122 is widened to receive coil springs 124 and 126 through which vertically passes pins 108 and 110 and against which washers 128 and 130 bear. The threaded end of each pin is recieved by a finishing reciprocally threaded nut designated by reference numerals 132 and 134 respectively. Washers 128 and 130, as well as finishing nuts 132 and 134, overlie top 136 of upper housing half 106.

Brake support 54 meets brake support upward extension 138, as seen especially in FIGURE 4. This extension is provided with an outwardly and downwardly beveled top piece 140 adaptable to overlie a coil spring 142 which is received in a vertical box-shaped slot 144 passing through the lower half of the housing 104 and communicating with an open area in upper half 106, as well as with stationary support 80. Resting on the horizontal top 146 of beveled top piece 140 is a cam means 148 comprising a generally circular bar 150 to which is welded along its length a generally circular smaller diameter bar 152. Smaller diameter bar 152 extends only a portion of the entire distance of the bar 150 (although it could pass along its entire length). Bar 150 along a portion of its length to which bar 152 is not welded is recieved in semicircular slots 154 and 156, being rotatable therein. Rotation is facilitated due to overlying semicircular slots 158 and 160 holding bar 150 in place. Semicircular slot 160 is not visible in the above figures. Thus rotation of bar 150 in the slots permits rotation of bar 152 in open area 160. To bar 150 there is affixed rotating level 162 which, when rotated from an "up" position in FIGURE 5 to a "down" position, i.e., counterclockwise as seen in FIGURE 4, causes bar 152 to rotate or move accordingly up the beveled side of brake top piece 140 to rest on horizontal top 46. Thus, the upward force of coil spring 142 is overcome by the force of the bar assembly causing the brake support upward extension to descend, thereby causing vertical brake support 54 to drop, thus dropping braking element 68 against caster wheel 12, stopping forward advancement of the cart, etc. The braked position of the caster assembly is shown in FIGURE 4.

Rotatable mount 26 is provided with a plurality of vertically extending locking holes therethrough. Four such locking holes are shown in the accompanying drawing, being designated by reference numerals 164, 166, 168 and 170, which are so proportioned as to receive a lateral revolution locking pin 172 shown in locking position in FIGURE 4. The pin 172 is spring biased employing coil spring 174 maintained in vertical channel 176. Vertical channel 176 is open at an end so as to communicate with a square U-shaped slot 178 at 180. Square U-shaped slot which appears as three-quarters of a rectangle is sized so as to receive the pin 172 actuating means generally designated by reference numeral 182. This actuating means 182 comprises arms 184 and 186 secured to pin 172 by virtue of cross pin 188 passing through arm holes 190 and 192 and by virtue of cross bar 194 secured by soldering or welding to pin 172 and ridable up and down side channel 196 of square U-shaped slot 176, as shown in FIGURES 4 and 5, the slot being shown in FIGURE 3.

Thus, when pin 172 is in alignment with any of the locking holes 164, 166, 168 or 170, and when in locking position, lateral rotation of caster wheel 12 (commonly known as swivel) is prohibited. The pin 172 is put in locking position using a cam type mechanism generally designated by reference numeral 198, which mechanism like cam mechanism 148 comprises a rod 200 and a smaller diameter rod 202 running parallel and being welded thereto. As in the case of the cam mechanism 148, rod 202 does not run the entire length of rod 200 as shown, but if one desired such a modification it could easily be changed. Rod 200 rests in semicircular slots 204 and 206 in lower housing half 104. Over rod 200 there is the upper half of the housing 106 provided with semicircular slots 208 and 210, permitting rotation of rod 200 and cam action due to movement of rod 202 on the surface of rod 200. Affixed to rod 200 is swivel lock lever 212. Hole 214 is provided in place 60 in registry with vertical channel 176 so that when the pin is dropped it passes through vertical channel 176, thence through hole 216 on stationary support 80, thence through hole 214 on plate 60, and into one of the locking holes 164, 166, 168 or 170.

Arms 184 and 186 have an upwardly extending triangularly shaped notch 218 in lateral registry which accommodates the rotatable cam member, as shown in FIGURE 4 and FIGURE 5. The latter figure shows the lock lever 212 in "down"', i.e., non-locking position so that rod 202 is in the notch, not allowing fulcrum action of the arms 184 and 186 by upward pressure. This keeps pin 172 upward due to the tension exerted by coil spring 174.

When in operation, the swivel action of the caster wheel 12 and, for that matter, the swivel action of the entire rotatable mount 26, is to be arrested, upward pressure against arms 184 and 186 is exerted by raising locking lever 212. This rotates rod 200 which in turn displaces smaller diameter rod 202. This causes greater upward force against the arms 184 and 186 at notch 218, thus providing a fulcrum type response about rod 200 which aproaches the notch with concomitant removal of rod 202.

The fulcrum type response causes pin 172 to exert a greater force downward than coil spring 174 has upward. Pin 172 travels downward, bringing arms 184 and 186 through the parallel side slots of the square U-shaped slot 178 and cross bar 194 down through side channel 196. Pin 172 passes through vertical channel 176, hole 216 on stationary support 80, and hole 214 on plate 60. The pin rests on the upper edge of rotatable mount 26 until one of the locking holes 164, 166, 168 or 170 is aligned with it. When aligned the pin drops through and locks the caster against swiveling, i.e., lateral rotation about pin 50.

Adjacent rotatable mount 26 and in abutting relationship therewith and in abutting relationship with plate 60 is a circular rubber gasket 250 running about rotatable mount 26 to protect the mechanism from intrusion of moisture, dust and/or dirt which may be injurious to the mechanism.

The brake mechanism is operated very easily. It should be noted that for operation of the brake no special wheel alignment is needed, i.e., the caster wheel 12 does not need to be aligned in a straight direction of travel with the cart on which it is mounted for the brake to exert a braking effect. It can be at an angle due to swivel of the rotatable mount 26 about a longitudinal axis relative to pin 50. Furthermore, it should be noted that the swivel lock can be operated when none of the locking holes 164, 166, 168 or 170 is in alignment. The swivel locking effect will take effect as soon as one of the locking holes becomes aligned in registry with hole 214 in plate 60 as the balance of the mechanism has been put in operation merely by the upward or clockwise revolution of locking lever 212.

Still another important advantage of my invention resides in the ease in which the caster wheels can be removed. Merely by loosening and removing nuts 94 and 96 the wheel section together with the rotatable mount 26 and the brake element 68 is removed together with plate 60, etc. Only the operating levers and parts responsive thereto remain affixed to the cart or other piece on which the caster was affixed.

It is readily seen from the foregoing that I have provided a significantly useful and novel caster assembly provided with braking elements to restrain forward and rearward movement as well as swivel action. The brakes of my invention can be operated by remotely positioned levels remote from the caster wheel. Hence my caster assembly does not utilize any dangerous radial projecting parts adjacent the caster wheel near the floor. It is thus particularly useful in schools, hospitals, libraries and other institutions on carts and other carrying means where safety is desired. It will be evident, however, that the caster assembly can be used on ordinary furniture, especially desks and office chairs.

What is claimed is:

1. A caster assembly comprising a laterally rotatable means provided with a caster wheel rotatable therewith, said caster wheel rotatable vertically with respect to said laterally rotatable means, a caster wheel brake means operable by a caster wheel brake actuating means located remote from said caster wheel, said laterally rotatable means partially housing said brake means and being rotatable with respect thereto, said brake means being operable regardless of the lateral position of said laterally rotatable means, wherein said brake means is in the form of an inverted cone, the periphery of the outer surface of which can engage the periphery of the caster wheel in braking position and wherein said brake means is provided with a brake support means passing through said laterally rotatable means such that said laterally rotatable means is rotated laterally thereabout, said brake actuating means operable to revolve a cam mechanism bearing on and to which said brake support means is responsive, whereby said brake support means is raised and lowered in response to the remote revolution of said cam mechanism, thereby raising and lowering said brake means out of and into braking relationship with said caster wheel.

2. A caster assembly comprising a laterally rotatable means provided with a caster wheel rotatable therewith, said caster wheel rotatable vertically with respect to said laterally rotatable means, a caster wheel brake means operable by a caster wheel brake actuating means located remote from said caster wheel, said laterally rotatable means partially housing said brake means and being rotatable with respect thereto, said brake means being operable regardless of the lateral position of said laterally rotatable means and wherein said brake means is in the form of an inverted cone, the periphery of the outer surface of which can engage the periphery of the caster wheel in braking position and wherein said brake means is provided with a brake support means passing through said laterally rotatable means such that said laterally rotatable means is rotated laterally thereabout, said brake actuating means operable to revolve a cam mechanism bearing on and to which said brake support means is responsive, whereby said brake support means is raised and lowered in response to the remote revolution of said cam mechanism, thereby raising and lowering said brake means out of and into braking relationship with said caster wheel and wherein said cam mechanism bears against a level horizontal member at the upward end of said brake support means, said horizontal member being provided with outwardly and downwardly sloping beveled sides, said cam mechanism being in the form of two wires of different diameter affixed in permanent relationship with one another along their longitudinal axis, whereby rotation of said cam mechanism causes the wire having the smaller diameter to descend partially over said beveled side, said level member being coil spring biased, permitting raising and lowering of said brake means in response to the position of said wires on said beveled side.

3. A caster assembly according to claim 2, wherein intermediate said laterally rotatable means and said brake support means there is a horizontal stationary plate provided with a downwardly extending column about which said laterally rotatable means is rotatable and within which said brake support means is rotatable, said horizontal stationary plate extending over said laterally rotatable means.

4. A caster assembly according to claim 3, wherein the bottom face of said horizontal stationary plate and the upward face of said laterally rotatable member are each provided with bearings which face one another and are in abutting relationship with one another.

5. A caster assembly according to claim 4, wherein the inside wall of said laterally rotatable member is provided with a bearing in abutting relationship with a bearing on the outside wall of said downwardly extending column.

6. A caster assembly according to claim 5, wherein there is a rubber gasket encircling said laterally rotatable means at its outward wall, said gasket being positioned at the interface with said horizontal stationary plate.

7. A caster assembly comprising a laterally rotatable means provided with a caster wheel rotatable therewith, said caster wheel rotatable vertically with respect to said laterally rotatable means, said laterally rotatable means being provided with a purality of vertical holes about its periphery adaptable to receive a lateral rotation braking pin, a horizontal stationary plate provided with a downwardly extending column about which said laterally rotatable means is rotatable, said horizontal stationary plate provided with at least one hole which when in registry with one of said vertical holes permits passage of said braking pin therethrough and into said vertical hole, thereby locking said laterally rotatable means to said horizontal stationary plate.

8. A caster assembly according to claim 7, wherein said braking pin is operated by a pin actuating means remote from said caster wheel, which is operable to revolve a braking pin cam means which causes laterally extending parallel arms to which said pin is affixed at its upper extremity via a cross bar connecting said arms to ascend and descend about said cam means functioning as a fulcrum, whereby said pin is raised and lowered out and into said vertical hole.

9. A caster assembly according to claim 8, wherein said parallel arms and said cross bar are received in slots in a housing provided therefor.

10. A caster assembly comprising a laterally rotatable means provided with a caster wheel rotatable therewith, said caster wheel rotatable vertically with respect to said laterally rotatable means, said laterally rotatable means provided with a plurality of vertical holes about its periphery adaptable to receive a lateral rotation braking pin, a horizontal stationary plate provided with a downwardly extending column about which said laterally rotatable means is rotatable, said horizontal stationary plate provided with at least one hole which when in registry with one of said vertical holes permits passage of said braking pin therethrough and into said vertical hole, thereby locking said laterally rotatable means to said horizontal stationary plate, a caster wheel brake means in the form of an inverted cone, the periphery of the outer surface of which can engage the periphery of the caster wheel in braking position, said caster wheel brake means operable by rotating a cam mechanism to which is responsive a brake support means passing through said laterally rotatable means such that said laterally rotatable means is rotatable thereabout, said brake support passing through a hole in said downwardly extending column of said horizontal stationary plate and affixed to said caster wheel brake means.

References Cited

UNITED STATES PATENTS

| | | | |
|---|---|---|---|
| 3,162,888 | 12/1964 | Mobus | 16—35 |
| 2,138,433 | 11/1938 | Sunden | 16—35 |
| 1,958,494 | 5/1934 | Pehrsson | 16—35 |
| 3,051,270 | 8/1962 | Burzlaff | 16—35 |
| 3,388,419 | 6/1968 | Crawford | 16—35 |

BOBBY R. GAY, Primary Examiner

D. L. TROUTMAN, Assistant Examiner

U.S. Cl. X.R.

188—1